United States Patent
Bellemare

(10) Patent No.: US 7,544,416 B2
(45) Date of Patent: Jun. 9, 2009

(54) THERMALLY REFLECTIVE ENCAPSULATED PHASE CHANGE PIGMENT

(75) Inventor: James V. Bellemare, Cobb Island, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 323 days.

(21) Appl. No.: 11/198,414

(22) Filed: Aug. 5, 2005

(65) Prior Publication Data

US 2007/0031652 A1 Feb. 8, 2007

(51) Int. Cl.
*B32B 5/16* (2006.01)

(52) U.S. Cl. .................. 428/403; 428/699; 428/913

(58) Field of Classification Search .................. 428/403, 428/699, 913
See application file for complete search history.

(56) References Cited

U.S. PATENT DOCUMENTS

| | | | | |
|---|---|---|---|---|
| 4,303,729 A | * | 12/1981 | Torobin | 428/327 |
| 5,709,945 A | * | 1/1998 | Lee et al. | 428/403 |
| 6,185,742 B1 | * | 2/2001 | Doherty | 2/81 |
| 6,703,128 B2 | * | 3/2004 | Myers et al. | 428/403 |
| 6,846,611 B2 | * | 1/2005 | Yuzurihara et al. | 430/270.13 |
| 6,939,610 B1 | * | 9/2005 | Kaul | 428/403 |

* cited by examiner

*Primary Examiner*—H. (Holly) T Le
(74) *Attorney, Agent, or Firm*—John J. Karasek; Joseph T. Grunkemeyer

(57) ABSTRACT

This invention pertains to particulate thermally reflective phase change material that includes an encapsulated phase change material coated with a thermally reflective layer.

20 Claims, 1 Drawing Sheet

THERMALLY REFLECTIVE ENCAPSULATED PHASE CHANGE PIGMENT

BACKGROUND OF THE INVENTION

1. Field of the Invention

This invention pertains to micro-sized, lightweight thermally reflective phase change material that is electrically conductive and is highly efficient at regulating temperature.

2. Description of Related Art

Phase change materials were first developed for astronauts' space gear to protect them from the extreme heat and cold experienced during space expeditions. These materials consist of paraffin waxes that are capable of storing large amounts of latent thermal energy through the process of phase changing. Conventional phase change materials offer an order-of-magnitude increase in thermal storage capacity over non-phase change based materials with the added benefit of nearly isothermal discharge. This allows the storage of large amounts of latent thermal energy without significantly changing the environment around the encapsulated phase change materials. The pigment particles are roughly 1-100 microns in diameter and are made by the Outlast company, which is currently one of the largest suppliers of such pigments. Another competing product is TEAP PCM Balls® that have an average diameter of 75,000 microns.

Thermal energy storage can be broken into two types: sensible heat and latent heat. Sensible heat is the thermal energy stored in a material as a result of an increase in temperature. Latent heat is the thermal energy that flows to or from a material without a change in temperature, but causes a phase change of the material. Materials such as water, concrete, wood, plastic and most metals, store thermal energy in the form of sensible heat. The advantage of a phase change material is the use of the latent heat that is available during the phase change process. A smaller amount of the heat storage capacity, depending on the temperature difference, consists of sensible heat. The same amount of thermal energy can be stored in a significantly smaller quantity of phase change material compared to that of water, wood, plastic, concrete, or even metal, as shown below in Table 1, wherein the encapsulated phase change materials (ECPMs) are heads and shoulders above the other materials in heat capacity:

TABLE 1

| i)   | Water    | 63 KJ/kg    |
| ---- | -------- | ----------- |
| ii)  | Concrete | 14.49 KJ/kg |
| iii) | Wood     | 27 KJ/kg    |
| iv)  | Copper   | 5.85 KJ/kg  |
| v)   | EPCMs    | 205 KJ/kg   |

Heat Capacities in KJ/kg $\Delta T$, $\Delta T = 15°$ C. = 15 K = 27° F.

For instance, the same amount of energy required to raise 1 kg of water to 1° C. would only raise the temperature of 1 kg of ECPMs to 0.31° C.

Conventional phase change materials are utilized in a wide array of commercial products including, but not limited to, clothing, thermal storage devices, sleeping bags, bedding, and building materials.

A few of the drawbacks to the conventional phase change materials include the fact that solar loading can be attributed to roughly ⅓ to ⅔ of the total heating of an outdoor structure. The most effective method of reducing this load is to either shade the structure or reflect as much of the thermal energy as possible. Current phase change pigments, such as Outlast's thermal additive powder, have limited thermal mass and no inherent ability to reflect any of this solar loading. They also have extremely low thermal conductivity, which creates the potential for the phase change materials to rapidly saturate thermally. Once the phase change materials have completely phase changed, thus becoming thermally saturated, they loose their isothermal properties and all of the advantages associated with phase change. Also, a large portion of apparel allows a person's body heat to escape due to fabric construction. Clothing utilizing conventional phase change materials can only regulate temperature by means of storing and releasing the thermal energy that a person's body produces. It is not very effective at reflecting body heat back to prevent its escape. It is also not effective in reducing the effects of solar heating in warm weather apparel.

Conventional phase change materials are not electrically conductive and have very low heat conductivity of about 0.18 W/m·K. A material with very low thermal conductivity will not be very effective in transferring heat from critical electronic component. Conventional phase change materials typically require coating them onto both sides of an electrically conductive aluminum foil or incorporating into electrically conductive grease to be used as an electrically conductive heat sink. This hinders their use as practical heat sinks in both commercial and military electronics.

Currently, there are five widely used processes for depositing thin conductive metal films and coatings. They are sputtering, RF and DC assisted; evaporation; chemical vapor deposition; electrochemical; and electroless deposition. All but electroless deposition have a negative effect on encapsulated phase change materials.

Sputtering, evaporation, and chemical vapor deposition require high temperatures for proper deposition of a metal film. Microencapsulated phase change materials are typically composed of a wax and an encapsulating polymer shell, both of which are highly susceptible to degradation by high temperatures. This prevents the application of a conducting layer by these methods.

Electrochemical deposition of conductive layers requires the parts being coated to be in direct contact with a cathode and an anode at all times for the reaction to occur. This works well for larger parts but it is almost impossible to simultaneously coat millions of micro particles.

The only truly feasible process to deposit a conductive layer on encapsulated phase change materials is by electroless deposition.

Particulate phase change materials can be metallized by electroless deposition with any of the following metals, or alloys of these metals: silver, gold, copper, nickel, palladium, platinum, rhodium, indium, tin, cobalt, molybdenum, ruthenium, and zinc. The aforementioned metals can be doped with various other elements from the Periodic Table. Transparent conductive oxides, such as indium oxide, tin oxide, zinc oxide, indium tin oxide, and indium zinc oxide, can also be deposited using electroless deposition.

OBJECTS AND BRIEF SUMMARY OF THE INVENTION

An object of this invention is to coat phase change materials with a metallic, thermally reflective coating in order to combat thermal overloading thereof.

Another object of this invention is to coat a phase change material to render it electrically conducting.

Another object of this invention is to prolong phase change in a phase change material.

Another object of this invention is to render phase change material multifunctional by providing thereon an atom thick layer of an electrically conducting coating.

DETAILED DESCRIPTION OF THE INVENTION

Figure 1:
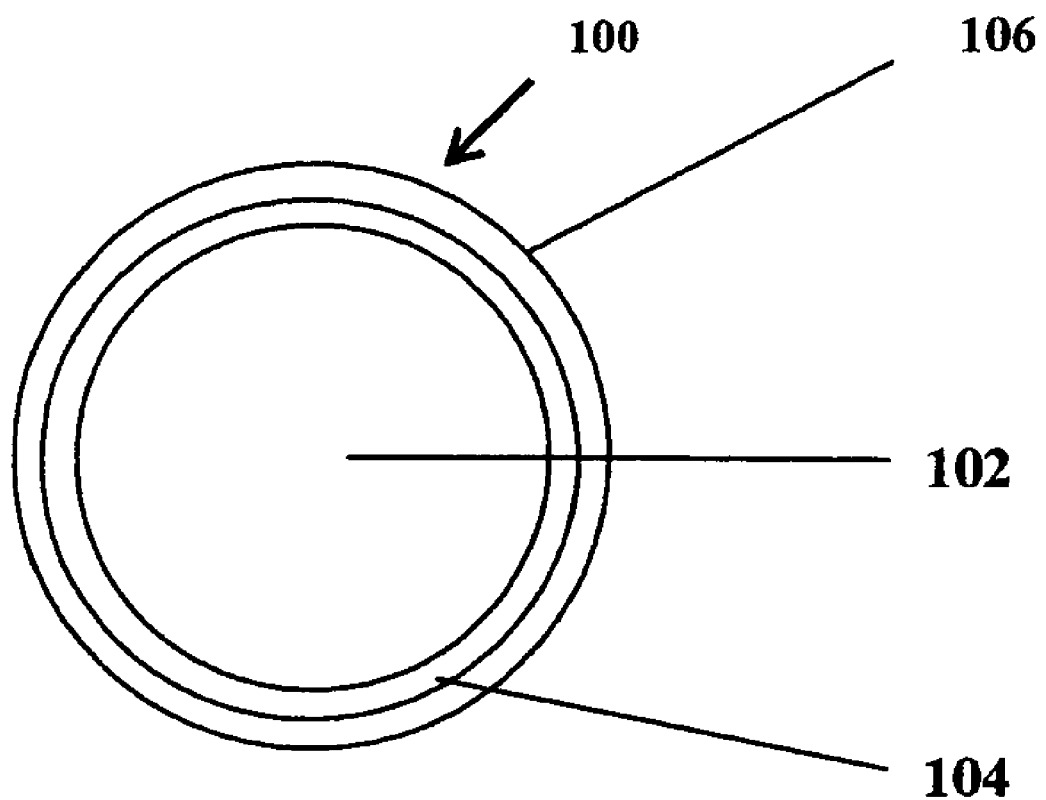
FIG. 1 is a schematic illustration of a typical encapsulated phase change material with an electrically conducting coating.

This invention pertains to a particulate product that is micro-sized, lightweight material, is electrically conductive and is highly efficient at regulating temperature. As shown schematically in FIG. 1, particle 100 has typical outside diameter in the range of 0.1-300 microns with an inner phase change material 102, such as paraffin wax, an encapsulating shell 104, typically acrylic about 0.1 to about 1 μm thick, and an outer metallic film 106, typically electrolessly deposited and about 600-900 Å thick. Although, typically, the outer metallic film is continuous, it need not be.

Fabrication of the particulate product includes the steps of cleaning or removing from an encapsulated phase change material surface or the surface of an encapsulant non-encapsulated phase change materials, ruptured capsules and other contaminants or extraneous matter; sensitizing the phase change material or the encapsulant surface with an activation solution in order to deposit a very thin layer of a catalytic metal thereon to facilitate deposition of a layer of desired electrically conducting material thereon; and depositing a very thin layer of the desired electrically conducting material thereon.

The encapsulated phase change materials are usually sold as "wet-cake" slurry, approximately 70% solids. As a result, residual non-encapsulated phase change material ruptured capsules and other contaminants are removed from the surface of the phase change material or the encapsulant by a cleaning process before the particles are sensitized and coated.

The first step in the cleaning process is to dissolve and remove the non-encapsulated phase change material and any debris from the core material or the encapsulant surface. This can be accomplished by placing the encapsulated or the non-encapsulated phase change material in a beaker with a solvent that can "degrease" the encapsulated phase change material or the encapsulant surface.

The second step is to heat the solvent to about 10° F. above the "phase" temperature of the phase change material used so that the residual phase change material and any other debris will melt and then dissolve in the solvent.

Next, the phase change material, with any contaminant thereon, and the solvent are mixed for up to about one hour. This mixing should be limited to about one hour in order to retain integrity of the phase change material. The temperature should remain constant at about 10° F. above the "phase" temperature to ensure that any residual phase change material and any contaminant thereon or on the encapsulant surface, is fully dissolved.

After mixing, the residual phase change material and/or debris floats to the top of the mixture and the liquid is slowly decanted off while it is still warm. The process is repeated once more to ensure complete removal of any contaminant.

After the second washing and decanting, the encapsulating phase change material is placed in a beaker with a room temperature solvent and mixed for another hour or so. The solvent from the encapsulating phase change material mixture is removed and poured into a funnel. Next, excess solvent is filtered and vacuumed off. After the solvent is removed, the damp encapsulated or non-encapsulated phase change material is placed in a glass dish and allowed to air dry.

The particulate phase change material is then typically encapsulated in a conventional manner, prior to sensitization.

Since the encapsulated or the non-encapsulated phase change materials are inherently electrically non-conductive, they are sensitized with an activation solution, such as one consisting of tin, palladium or other ions. This process deposits a monolayer of a catalytic metal on the material or the encapsulant surface, allowing subsequent electroless deposition of desired metallic coating material.

There are other processes that can be utilized to sensitize the encapsulated or non-encapsulated phase change materials and the one given below is typical. Typical metallic materials for electroless coating described herein include silver, nickel, cobalt, copper, palladium, gold, indium, alloys thereof and, generally, any electrically conducting material. A silver compound is generally selected to deposit silver since plating rate is faster for silver than other materials. Silver generally plates up to twice as fast as nickel or palladium.

The sensitization process for electroless deposition of silver was carried out as follows:

100 grams of Frisby's Thermosorb TO-83 encapsulating phase change material (identify) was weighed out in a 2000-ml beaker. Distilled water, in amount of 800 ml, was then added to the beaker and the solution was then stirred using a laboratory bench top mixer. The temperature of the solution was 20-25° C.

In a separate 200-ml beaker, 1000 ml of distilled water and 1 ml of 38% hydrochloric acid were measured out. Once the beaker was filled, it was placed on a magnetic stirring hot plate and a magnetic stir bar was added to the solution. The stirring plate was turned on and the speed was slowly increased to the point just before cavitation began. Tin chloride ($SnCL_2$), in amount of 0.1 gram, was slowly added to the 100 ml acid aqueous solution and mixed until tin chloride was dissolved. The resulting solution was clear.

Next, the clear tin chloride solution was slowly added to the 2000-ml beaker containing the phase change material and distilled water. The solution was mixed to ensure complete sensitization of the phase change material.

After 30 minutes, the mixture was removed from the mixer and was poured into a Buchner funnel and placed on a 4000-ml Erlenmeyer flask. The flask had a fine filter and was connected to a vacuum system. The liquid was filtered off under vacuum and the phase change material was rinsed with two additional 1000-ml beakers of distilled water. Next, the phase change material was rinsed with 750 ml of acetone and allowed to air dry at room temperature for about 10 minutes, allowing some of the remaining acetone to evaporate. Finally, the phase change material was placed in a glass dish in an oven at 100° C. for about 1 hour to dry.

There are two basic types of electroless deposition processes for the deposition of an electrically conducting material: alkaline and acidic. These two processes can further be broken down into many different variants. This invention utilizes, but is not limited to, a single, stoichiometric equation for the reactants used to electrolessly deposit metals. This process allows for the deposition of metals at low temperatures and a slightly alkaline pH.

The reaction is designed to be conducted at a pH range of 8-10, with an optimum pH of about 9.

There are several alkaline materials that can be used to raise pH of the electroless deposition solution, including, but not limited to ammonium hydroxide and 2-aminoisobutanol. In a preferred embodiment, ammonium hydroxide is typically used to regulate pH and chelate the metal ions.

Integrity of the encapsulating phase change materials can be compromised at temperatures greater than 80° C. Thus, care must be taken to electrolessly deposit the metals at temperatures lower than 80° C.

The reaction will proceed at temperatures of 30-50° C., with the optimum operating temperature typically being about 40° C.

There are several methods for electrolessly depositing an electrically conducting material on a phase change material, which include, but are not limited to, glucose method, Rochelle salt method, formaldehyde method, hydrazine method, organic method, aldonic acid method and lactone method. A derivative of the glucose method is used primarily herein due to its rapid plating rate and the high quality of the deposited material film that is deposited.

Electroless deposition reactions are alkaline in nature and utilize different bases including typically, but not limited to, ammonium hydroxide ($NH_4OH$) and sodium hydroxide (NaOH).

The standard glucose method used for electroless deposition of silver utilizes ammonium hydroxide ($NH_4OH$) as a complexing agent and it also serves to raise pH of the solution. Although ammonium hydroxide is an extremely good complexing agent, it has an extremely unpleasant odor. Since ammonium hydroxide has a low boiling point, it is very volatile and evaporates quickly as the electroless deposition reaction proceeds.

Used herein is 2-aminoisobutanol due to its low odor, reduced volatility, and its proficiency as a complexing agent for the silver ions($Ag^+$) in solution.

The following is a detailed example of the electroless deposition of silver on an encapsulating phase change material. This process can be used to deposit silver, or any other electrically conducting material, on the surface of a phase change material or on the surface of an encapsulant.

First, two grams of the sensitized encapsulated phase change material was weighed out from the phase change material prepared earlier. The two grams of the material was placed in an automated Quantachrome® Helium Pycnometer and density of the sensitized phase change material was measured. After measuring the density of the material, the 2 grams of material was returned to the remaining 98 grams of the material.

Next was measured the average particle size of the encapsulated phase change material. An accurate particle size is crucial for thickness control of the electrically conducting material applied by electroless deposition. The particle size of the encapsulating phase change material was measured with a Beckman Coulter® Mark 3 Coulter Counter™ particle size analyzer. The particle size analyzer was configured to give the percentage of particles that fall into a given diameter. The particle size analyzer calculates the average diameter of the particles of the sample. The average particle diameter of the encapsulated phase change material was used to calculate the information for precise thickness control of the electrically conducting layer applied onto the encapsulated phase change material.

Next was calculated the average volume of the encapsulated phase change material particle. The following equations to determine the average volume of a single encapsulating phase change material particle was used:

$$V_s = (4/3)\pi(d/2)^3$$

$V_s$=Average Volume of one particle $\pi$=3.1412 d=Average particle diameter of sample

Next was calculated the average surface area of one encapsulated phase change material particle. The following equations to determine the average surface area of a single encapsulated phase change material particle was used:

$$S_s = 4\pi(d/2)^2$$

$S_s$=Average surface area of one particle $\pi$=3.1412 d=Average particle diameter of sample

Using the results from above, total volume of the encapsulating phase change material sample was determined. The following equations to determine the total volume of the encapsulated phase change material sample was used:

$$V_t = w/p$$

$V_t$=Total Volume of encapsulated phase change material sample

W=Weight of encapsulated phase change material sample p=Density of encapsulated phase change materials sample Next was determined the total number of particles in the encapsulated phase change material sample. The following equation calculated the number of particles in the sample of the encapsulated phase change material:

$$P = V_t/V_s$$

P=Number of encapsulated phase change material particles in the sample $V_t$=Total volume of encapsulated phase change material sample $V_s$=Volume of one encapsulated phase change material particle Next was determined the total surface area of encapsulated phase change material sample. The following equations were used to calculate the surface area of the encapsulated phase change material sample:

$$S_t = P(4\pi(d/2)^2)$$

$S_t$=Total surface area of sample

P=Number of encapsulated phase change material particles in the sample $\pi$=3.1412 d=Average particle diameter of the encapsulated phase change material

The following calculations determine amount of silver required to produce a reflective metallic coating of a desired thickness on the various phase change materials. For example, as the thickness of the silver increases up to a limiting thickness, thermal reflectivity and electrical conductivity also increase. The following steps and equations were used for determining electroless deposition of silver on the encapsulated phase change material.

First was calculated the amount of silver required to coat the encapsulated phase change material of a desired thickness. Diameter of the encapsulated phase change material particles was reported in microns and to facilitate further calculations, the metal thickness was converted to microns with the following equations:

$$\mu = A 10^{-4}$$

A=Value in angstroms 900 angstroms of silver is equal to 0.09 μm of silver

The actual amount of silver required was calculated using the following steps. Volume of silver needed to coat one encapsulated phase change material particle was calculated using the following equations:

$$V_{silver} = [((d+2t)/2)\pi(4/3)] - [(d/2)^3\pi(4/3)]$$

$V_{silver}$=Volume of silver needed to coat on encapsulated phase change material particle d=Diameter of uncoated encapsulated phase change material particle t=Thickness of silver coating, in microns $\pi$=3.1412

Next determined was total volume of silver needed to coat the encapsulated phase change material sample with 900 angstroms of silver. The volume of silver that was needed to coat the encapsulated phase change material sample was calculated using the following equations:

$$VT_{silver} = V_{silver} P$$

$VT_{silver}$=Total volume of silver required to coat encapsulated phase change material sample $V_{silver}$=Volume of silver needed to coat one encapsulated phase change materials particle P=Number of encapsulated phase change material particles in the sample Next determined was the weight of silver needed to coat the encapsulated phase change material sample with 900 angstroms of silver. The weight of the silver metal required to coat the encapsulated phase change material sample was calculated using the following equations:

$$WT_{silver} = \rho_{silver} vtsilve$$

$WT_{silver}$=Total weight of silver required to coat encapsulated phase change material sample $\rho_{silver}$=Density of silver (10.2 g/cc)

$VT_{silver}$=Total volume of silver required to coat the encapsulated phase change material sample Next determined was the total weight of silver salt needed to coat the encapsulated phase change material sample with 900 angstroms of silver.

There are several silver compounds that can be used to electrolessly deposit silver, including, but not limited to, silver (I) nitrate ($AgNO_3$), silver (I) fluoride (AgF), silver (I) perchlorate ($AgClO_4$), silver (I) perchlorate monohydrate ($AgClO_4$—$H_2O$), and silver (I) chlorate ($AgClO_3$). Used herein was silver nitrate ($AgNO_3$) because it is readily available and highly soluble in water, at 234 grams of silver nitrate per 100 grams of water.

Weight of silver (I) nitrate required to coat the encapsulated phase change material particles was calculated using the following set of equations:

% silver in silver (I) nitrate:

$$\%_{silver} = Mw_{silver}/(MW_{silver\,nitrate})$$

$\%_{silver}$=weight % of silver in $AgNO_3$ $MW_{silver}$=molecular weight of silver (107.8682 g/mole)

$Mw_{silver\,nitrate}$=molecular weight of $AgNO_3$ (169.873 g/mole)

$$\%_{silver} = 107.8682\,g/mole/169.8730 = 63.50\%$$

There is 63.50% silver in silver nitrate($AgNO_3$).

Weight of silver (I) nitrate required:

$$W_{silver\,nitrate} = WT_{silver}/\%_{silver}$$

$W_{silver\,nitrate}$=weight of silver (I) nitrate required $WT_{silver}$=weight of silver in silver (I) nitrate required $\%_{silver}$=% weight of silver in silver (I) nitrate The thermally reflective particulate encapsulated phase change materials can be used in architectural coatings and sheetrock to better regulate interior temperature of a building; in automobile paints to help reduce the interior temperature of a vehicle; in highly efficient storage systems; in electrically conducting heat sinks for critical electronic components; in combination thermally reflective, latent heat absorptive EMI shielding coatings for satellites, space craft, cell phones, computers, military and non-military vehicles and communication systems; athletic apparel used to help reduce the risk of the athlete over-heating or experiencing harmful, rapid cooling; in protective clothing used for exposure to elevated temperatures, i.e., firefighters, rescue personnel, military personnel; and the like.

Having described the invention, the following example is given as a practical embodiment thereof and to demonstrate the practice and advantages thereof. It is understood that the example is given by way of illustration and is not intended to limit the specification or the claims in any manner.

EXAMPLE

This example demonstrates electroless plating with a monolayer coating of silver on a 100 g particulate sample of encapsulated phase change pigment material with a density of 0.9 g/cc and particle diameter of 22.0 microns. The particulate phas change material used was Frisby's Thermosorb TO-83 material where the core material was octodecane wax. Silver thickness on each particle was 900 angstroms. Volume of one particle was $5.57528 \times 10^{-9}$ cm$^3$, surface of one particle was $1.52 \times 10^{-5}$ cm$^2$, sample volume was 111.11 cm$^3$, number of particles in the sample was $1.99 \times 10^{10}$, volume of one coated particle was $5.71325 \times 10^{-9}$ cm$^3$, volume of one particle coating was $1.3797 \times 10^{-10}$ cm$^3$, volume of coating sample was 2.746 cm$^3$, and weight of silver was 28.005 g.

Procedure of coating the particulate encapsulated phase change material with silver from 44.17 g of silver nitrate ($AgNO_3$), was as follows:

a. A 2000 ml beaker, which has been cleaned with nitric acid, was charged with 888.88 ml of distilled water and heated to 30° C. A laboratory mixer was used and a stirrer to stir the water.

b. 44.17 grams of silver nitrate were added to the 2000 ml beaker and allowed to dissolve fully. The resulting solution was clear.

c. The 100-gram sample of the phase change material that was prepared in the sensitization process was added to the solution. All of the encapsulated phase change material was washed off the sides of the beaker so that it will be coated during the reaction.

d. After the phase change material sample was thoroughly mixed into the solution, slowly added was 69.53 grams of 2-aminoisobutanol. The solution changed color from clear to dark reddish brown during the initial addition of the 2-aminoisobutanol. The color change indicates formation of silver oxide ($Ag_2O$).

e. After all of the 2-aminoisobutanol was added, the solution changed color from dark reddish brown to a translucent yellow. The phase change material sample changed color from its original white to a light tan (when). The encapsulated phase change material color change indicates formation of a monolayer of silver oxide on the surface of the phase change material particles.

f. Next, the pH was checked to verify that it was approximately 8.0-8.5. If the pH is less than 8.0, add 2-aminoisobutanol. If the pH is greater than 8.5, the bath is unstable and the reaction should be aborted and restarted over again.

g. Next, added was 19.8 grams of dextrose to the solution with stirring. The solution turned dark brown after the dextrose was added. As the reaction progressed, the solution became lighter and the phase change material particles turned a dark grey.

h. After 10 minutes, the solution cleared and the material slowly slowly turned light grey.

i. The reaction was allowed to proceed for 60 minutes. The phase change material particles were very light tan in color and the solution was clear, indicating that all of the silver has been deposited on the phase change material particles.

j. A 10-inch diameter Buchner funnel was placed on a 4000 ml Erlenmeyer flask and a piece of small porosity of less than 5 microns filter paper was placed in the funnel. The Erlenmeyer flask was connected to a vacuum pump and the wet filter paper was installed and smoothed out to ensure there was no air bubbles trapped beneath it.

k. Next, the 2000 ml vessel containing the silver coated encapsulated phase change material particles and solution was slowly emptied into the Buchner funnel and vacuum-filtered off the electroless deposition solution.

l. 1500 ml of distilled water was poured over the silver coated phase change material particles and then vacuum-filtered water off to remove any contaminants left behind from the electroless deposition solution.

m. After the water had been vacuum-filtered off, 1000 ml of acetone was poured over the silver coated phase change material particles and then vacuum-filtered the acetone off. The acetone was used to remove any excess water, which may oxidize the silver coating.

n. The silver coated phase change material particles were air dried for 60 minutes and then placed in the oven at 100° C. until they were thoroughly dry.

o. Using a digital voltmeter equipped with a probe for measuring surface resistance, conductivity of the silver coated phase change material particles was then measured, which was about 0.40 Ω/sq inch. The surface resistance of the silver coated phase change material particles was about 0.40 Ω/sq inch.

p. Thermal reflectance of the silver coated phase change material particles was measured using a SOC-100 Hemispherical Directional Reflectometer. The reflectance in the thermal bands averaged about 75% of the standard. (?)

While presently preferred embodiments have been shown of the novel thermally reflective phase change materials, and of the several modifications discussed, persons skilled in this art will readily appreciate that various additional changes and modifications can be made without departing from the spirit of the invention as defined and differentiated by the following claims.

What is claimed is:

1. A solid product comprising a plurality of particles, each particle comprising a core comprising a phase change material and a thermally reflective layer enveloping the core.

2. The product of claim 1 wherein the particle outside diameter is in the range of 0.1-300 microns.

3. The product of claim 2 further comprising an encapsulating layer between said phase change material and said thermally reflective layer.

4. The product of claim 3 wherein the thickness of said encapsulating layer is in the range of 0.1-1 micron.

5. The product of claim 4 wherein said thermally reflective layer comprises a metal or alloy and said product includes a sensitization layer between said encapsulating layer and said thermally reflective layer.

6. The product of claim 5 wherein the thickness of said sensitization layer is a monolayer and said sensitization layer can bond to said encapsulating layer but not to said sensitization layer.

7. The product of claim 6 wherein said phase change material is selected from the group consisting of waxes, pigments and mixtures thereof; wherein said thermally reflective layer comprises a metal or alloy; and said sensitization layer is derived from tin chloride ($SnCl_2$).

8. The product of claim 7 wherein the outside diameter of said particles is in the range of 1-50 microns.

9. The product of claim 8 wherein said thermally reflective layer comprises silver, tin, palladium, or a mixture thereof.

10. The product of claim 9 wherein said thermally reflective layer is deposited on said sensitization layer by electroless deposition and wherein said phase change material changes from solid to liquid at a temperature below about 80° F.

11. A particle comprising a core comprising a phase change material, an encapsulating layer disposed on said phase change material, and a thermally reflective layer enveloping said encapsulated phase change material.

12. The particle of claim 11 wherein said particle has an outside particle diameter in the range of 0.1-300 microns.

13. The particle of claim 12 wherein the thickness of said encapsulating layer is in the range of 0.1-1 micron.

14. The particle of claim 13 wherein said thermally reflective layer comprises a metal or alloy and said product includes a sensitization layer between said encapsulating layer and said thermally reflective layer.

15. The particle of claim 14 wherein the thickness of said sensitization layer is a monolayer and said sensitization layer can bond to said encapsulating layer but not to said sensitization layer.

16. The particle of claim 15 wherein said phase change material is selected from the group consisting of waxes, pigments and mixtures thereof; wherein said thermally reflective layer comprises a metal or alloy; and said sensitization layer is derived from tin chloride ($SnCl_2$).

17. The particle of claim 16 wherein outside diameter of said particle is in the range of 1-50 microns.

18. The particle of claim 17 wherein said thermally reflective layer comprises silver, tin, palladium, or a mixture thereof.

19. The particle of claim 18 wherein said thermally reflective layer is deposited on said sensitization layer by electroless deposition and wherein said phase change material changes From solid to liquid at a temperature below about 80° F.

20. The particle of claim 19 wherein said encapsulating layer is free of extraneous matter.

* * * * *